C. BARNS.
Harvester Rake.

No. 88,358.

Patented March 30, 1869.

UNITED STATES PATENT OFFICE.

CHARLES BARNS, OF OSKALOOSA, IOWA.

IMPROVEMENT IN HARVESTER-RAKES.

*Specification forming part of Letters Patent No. 88,358, dated March 30, 1869.*

*To all whom it may concern:*

Be it known that I, CHARLES BARNS, of Oskaloosa, in the county of Mahaska and State of Iowa, have invented a new and Improved Raking Attachment for Reapers; and I do hereby declare that the following is a full, clear, and exact description thereof, which will enable others skilled in the art to make and use the same, reference being had to the accompanying drawings, forming part of this specification, in which—

Figure 1:
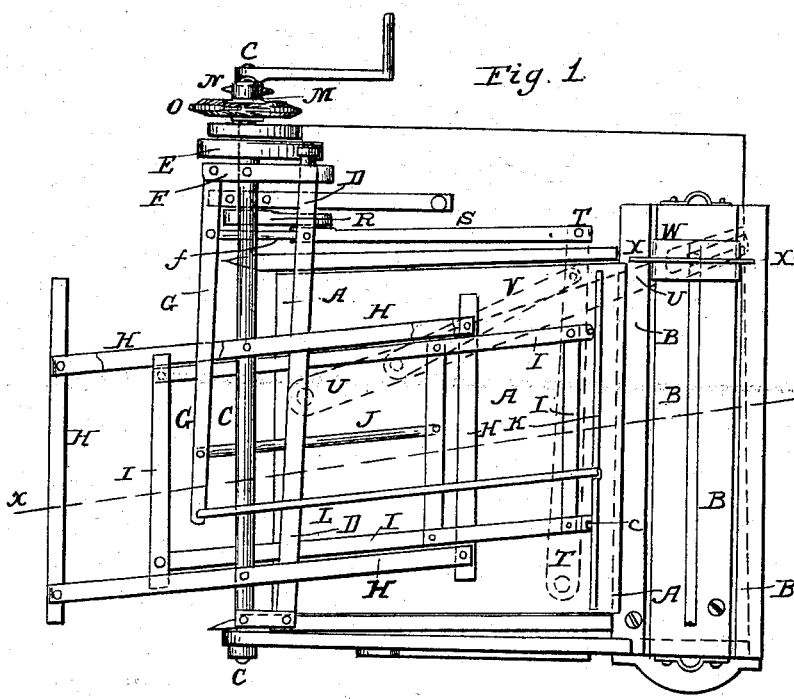
Figure 2:
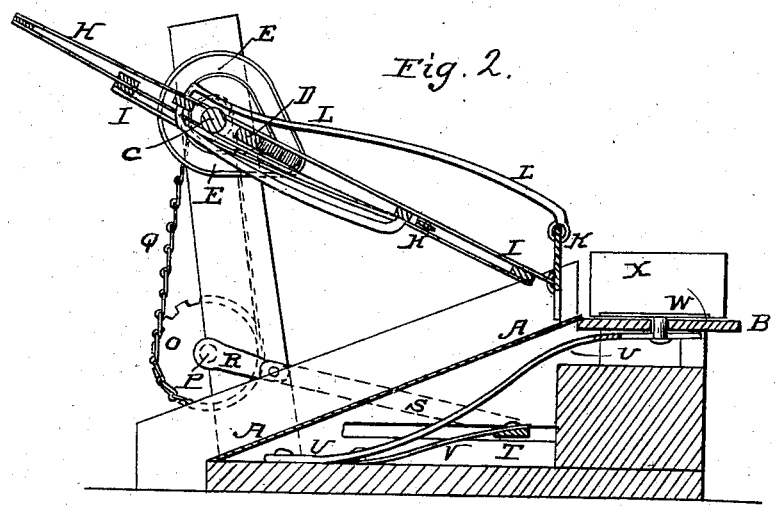

Figure 1 is a top or plan view of my improved device. Fig. 2 is a detail sectional view of the same, taken through the line $x\ x$, Fig. 1.

Similar letters of reference indicate corresponding parts.

My invention has for its object to furnish an improved raking attachment for reapers, which shall be so constructed and arranged as to take the grain as it drops from the cutters and deliver it to the binders or upon the ground, as may be desired, and which shall at the same time be simple in construction and effective in operation; and it consists in the construction and combination of the various parts, as hereinafter more fully described.

A is an inclined platform, placed directly in the rear of the cutters and extending up to the horizontal platform B.

C is a shaft revolving in bearings in suitable supports attached to the frame of the machine.

D is a lever, one end of which is pivoted to ears formed upon the side of the shaft C, and the other end of which has a friction-wheel attached to it, and enters a cam-groove formed in the face of the plate E, through which the shaft C passes, and which is firmly secured to the support in which the said shaft C works. The lever D is kept in proper position with reference to the shaft C by the arms F, between which the said lever passes and which are securely attached to the shaft C.

G is a lever, one end of which is pivoted to and between the ends of the arms E, upon the opposite side of the said shaft C from the lever D, and which is connected with the lever E by the connecting-bar $f'$, one end of which is pivoted to the lever D and its other end to the lever G.

H is a frame rigidly attached to the shaft C in a slightly oblique position, so as to be carried around with and by the said shaft. The longitudinal bars of the frame H are made double, or are grooved to serve as ways for the frame I to slide in as it is operated by the lever G, with which it is connected by the connecting-rod J, one end of which is pivoted to the said lever G, and its other end to the said sliding frame I, the oblique position of the frame H enabling the sliding frame I to be operated with less friction than it would have were the frame H at right angles with the shaft C.

K is the rake bar or head, which is pivoted at its lower edge to the lower or outer end of the sliding frame I, and its upper edge is connected with the lever G by the connecting-bar L, one end of which is pivoted to the end of the said lever G, and the other end of which is pivoted to the middle part of the upper edge of the said rake-bar, so as to hold the said rake-bar in proper position while carrying the grain up the inclined platform A.

M is a sprocket-wheel attached to the end of the shaft C, and around which, and around one or the other of the sprocket-wheels N O, attached to the end of the shaft P, passes an endless chain, Q.

The sprocket-wheel N is made of the same size and with the same number of teeth as the sprocket-wheel M, and the sprocket-wheel O is twice as large and has twice as many teeth as the said sprocket-wheel M, so that when the chain Q is passed around the wheel N, the shaft P may be made to revolve in the same time as the shaft C, and so that when the chain Q is passed around large sprocket-wheel O the shaft P may be made to revolve once while the shaft C is revolving twice.

The shaft P revolves in bearings in suitable supports attached to the frame of the machine, and to its inner end is attached a crank, R, to the crank-pin of which is pivoted the end of the connecting-bar S. To the other end of the connecting-bar S is pivoted the outer end of the lever T, which passes in beneath the inclined platform A, and its other end is pivoted to the frame of the machine, upon the opposite side from the crank R.

U is a lever, one end of which is pivoted to the frame of the machine beneath the middle part of the lower edge of the inclined platform A, and which is connected with the lever T by the connecting-rod V, one end of which is pivoted to the lever T, and the other end of which is pivoted to the lever U, so that the said lever U may be operated by the movement of the said lever T. The rear end of the lever U passes back beneath the horizontal platform B, and is pivoted to the slide W, with which it is connected by a bolt or pivoting-pin passing through a longitudinal slot in the said platform B. The ends of the slide W are provided with downwardly-projecting flanges, which enter guide slots or grooves in the platform B, so as to cause the said slide to move squarely along the said platform B. To the slide W is attached the lower edge of the board X, so that the said board may be carried along the platform B by the slide W, carrying with it the grain that may have been upon said platform.

The grain from the platform B may be received and bound by men standing upon the machine, or it may be allowed to drop from said platform to the ground, as may be desired. In the first case the chain Q should be passed around the large sprocket-wheel O, so that the slide W X may sweep the grain alternately to the opposite sides of the machine. In the second case the chain Q should be passed around the small sprocket-wheel N, so that the grain may always be dropped from the same side of the machine.

Having thus described my invention, I claim as new and desire to secure by Letters Patent—

1. The levers D and G, cam-plate E, arms F, connecting-bars $f'$ and J, rigid frame H, sliding frame I, rake bar or head K, and connecting-bar L, combined with each other and with the shaft C, and inclined and horizontal platforms A and B, substantially as herein shown and described, and for the purpose set forth.

2. The slide X X W, levers T U, and connecting-bars V and S, combined with each other, with the horizontal platform B, and crank R of the shaft P, substantially as herein shown and described, and for the purpose set forth.

CHARLES BARNS.

Witnesses:
JOHN F. LACEY,
J. F. EVERETT.